Patented Oct. 6, 1936

2,056,916

UNITED STATES PATENT OFFICE 2,056,916

DETERGENT COMPOSITION

Waldemar Blech, Cleveland, Ohio, assignor to Thurlow G. Gregory, Cleveland, Ohio No Drawing. Application April 19, 1932, Serial No. 606,294

1 Claim. (Cl. 87—5)

This invention relates to a detergent composition especially adapted for the removal of coatings of cellulose lacquers, paints, enamels, varnishes, printer's ink, and similar materials, from the skin and without appreciable injury thereto. It is well known that regular commercial cellulose lacquer solvents as hereinafter mentioned are injurious to the skin and when attempt is made to use them alone, with water or with soap and water to remove cellulose lacquers and other coatings from the skin, they are not effective, are costly and decidedly harmful.

It is also true that these cellulose lacquer solvents are not compatible with an aqueous soap solution and will not unify therewith even upon continued agitation.

The principal object of the invention is to provide such a relatively harmless composition which shall be effective in the removal of cellulose lacquers and the other materials mentioned as well as such other substances or stains as can be removed by ordinary soap. A further object of the invention is to provide a stable and for all practical purposes a permanent emulsion or unification containing an aqueous soap solution and one or more solvents for the materials mentioned, hereinafter referred to as lacquer solvents. A still further object is to provide such an emulsion containing a plurality of lacquer solvents one of which is more volatile than the others and also more rapid in its solvent action whereby to secure the advantage of a quick, loosening, solvent action upon lacquer and the stains as well as preventing re-deposition when such volatile solvent has evaporated.

Other and more limited objects will become apparent as the description proceeds. In order than any person skilled in the art to which this invention relates may be able to compound and use detergent compositions embodying my invention, I give the following illustrative formulae:

No. 1

| | Pounds |
|---|---|
| Pentyl acetate | 9.2 |
| Butyl acetate | 4.9 |
| Ethyl acetate | 4.7 |
| Saponification glycerine | 17.0 |
| Soap chips | 11.7 |
| Diatomaceous earth | 13.0 |
| Pumice | 11.7 |
| Water | 27.1 |
| Oil of sassafras | .7 |
| | 100.0 |

No. 2

| | Pounds |
|---|---|
| Pentyl acetate | 9.2 |
| Butyl acetate | 4.9 |
| Ethyl acetate | 4.7 |
| Glycerine | 10.2 |
| Sodium hydroxide | 6.8 |
| Soap chips | 11.7 |
| Diatomaceous earth | 13.0 |
| Pumice | 11.7 |
| Water | 27.1 |
| Oil of sassafras | .7 |
| | 100.0 |

No. 3

| | Pounds |
|---|---|
| Pentyl acetate | 9.2 |
| Butyl acetate | 4.9 |
| Ethyl acetate | 4.7 |
| Glycerine | 13.6 |
| Sodium hydroxide | 3.4 |
| Soap chips | 11.7 |
| Diatomaceous earth | 13.0 |
| Pumice | 11.7 |
| Water | 27.1 |
| Oil of sassafras | .7 |
| | 100.0 |

No. 4

| | Pounds |
|---|---|
| Pentyl acetate | 5.61 |
| Butyl acetate | 10.29 |
| Carbon tetrachloride | 6.55 |
| Glycerine | 6.55 |
| Soda ash | .94 |
| Soap chips | 14.96 |
| Diatomaceous earth | 14.00 |
| Sand | 19.34 |
| Water | 21.51 |
| Oil of sassafras | .25 |
| | 100.00 |

No. 5

| | Pounds |
|---|---|
| Butyl acetate | 12.16 |
| Carbon tetrachloride | 6.55 |
| Glycerine | 6.55 |
| Soda ash | .94 |
| Soap chips | 14.96 |
| Diatomaceous earth | 14.00 |
| Sand | 19.34 |
| Water | 25.25 |
| Oil of sassafras | .25 |
| | 100.00 |

No. 6

| | Pounds |
|---|---|
| Ethyl propionate | 12.16 |
| Carbon tetrachloride | 6.55 |
| Glycerine | 6.55 |
| Soda ash | .94 |
| Soap chips | 14.96 |
| Diatomaceous earth | 14.00 |
| Sand | 19.34 |
| Water | 25.25 |
| Oil of sassafras | .25 |
| | 100.00 |

No. 7

| | Pounds |
|---|---|
| Butyl acetate | 12.32 |
| Carbon tetrachloride | 6.64 |
| Glycerine | 6.63 |
| Soap chips | 15.13 |
| Water | 25.57 |
| Sand | 19.53 |
| Diatomaceous earth | 14.18 |
| | 100.00 |

From the above it will be noted that in each case there is provided one or more lacquer solvents which in these examples are aliphatic esters. It is to be understood that other aliphatic esters may be employed instead of those indicated in the formulae. Such ingredients as ethylene-glycol-monoethyl-ether acetate, ethylene-glycol-monobutyl-ether acetate may also be used. In each case soap and water are employed. In addition to these basic ingredients and the usual perfume, abrasive and filler, there is provided in each case one or more emulsifying ingredients. In the first example, the emulsifying agent is saponification glycerine which is glycerine containing from 30% to 40% of caustic soda. As is clear from the third formula, the caustic soda content need not be as great as this. The saponification glycerine is, however, satisfactory, and, being a commercial product, is desirable in some cases for commercial reasons. As is clear from the fourth example which also includes carbon tetrachloride, it is possible to employ glycerine and soda ash (sodium carbonate) instead of glycerine and caustic soda as emulsifying agent. In such case, the proportions will necessarily be changed, as is clearly indicated. I have found that carbon tetrachloride may also be used as an emulsifying agent and that it may be used alone or mixed with the other emulsifying agents, using a smaller quantity of each. In other words, the emulsifying agents are compatible and may be mixed without losing their efficacy. Inasmuch as there are individual idiosyncracies of hypersensitiveness to both the alkali and carbon tetrachloride, it is desirable to be able to furnish the detergent composition using either of these which may be required by a particular user. Also by using a mixture it is possible so to reduce the amounts of each as to avoid this difficulty in the case of some users. Formula No. 7 is an example of a composition employing carbon tetrachloride only, while Formula No. 6 is one employing a mixture.

It will be noted that in Formulae 1, 2 and 3 a combination of lacquer solvents has been employed consisting of the highly volatile and quick acting ethyl acetate in combination with the less volatile and slower acting pentyl and butyl acetates. When the composition is used, as in washing the hands, the ethyl acetate will rapidly loosen and dissolve the lacquer or similar material, whereupon it will be brought into such close and intimate contact with the other two solvents that it will be retained in solution even after the ethyl acetate has evaporated. It should be understood that the tendency to rapid evaporation just referred to is present only after the composition has been applied in use and does not occur to an appreciable extent when the material is packed in containers.

In producing the novel composition, a quantity of soap (the sodium or potassium salt of stearic, oleic or palmitic acid), is dissolved in water and the abrasive material is added while the solution is kept in agitation, whereupon glycerine and the alkali and, if desired, a suitable perfume, are introduced. A quantity of filler, such as diatomaceous earth is added and thereafter the solvents are slowly introduced. Finally the remainder of the filler is added with agitation and the emulsion is left for a few hours after which it sets into a paste and is then ready for use. This setting into paste tends to hold the volatile solvents and prevents evaporation to a practical degree.

This invention includes the features of bringing about unification of these incompatible substances and also using cellulose lacquer solvents in sufficient quantity to dissolve cellulose lacquer and remove it without appreciable injury to the skin.

These solvents which are not miscible to a practical degree with water or an aqueous soap solution and which therefore cannot be readily rinsed from the hands but must remain and evaporate with injury to the skin become in this composition fully miscible and rinsable.

These ingredients will, therefore, accomplish in combination what they will not accomplish separately or successively.

While the proportions given in the illustrative formulae are not sharply critical, they are so far as my experiments indicate the optimum proportions and if departed from too far will result in an unstable emulsion, that is, one which is less permanent or a product that may be harmful to the skin. It is possible to make an emulsion somewhat less permanent than would result from the exact proportions given without destroying the commercial value of the product. Care should be taken however to provide such stability as will endure during the normal time which may be expected to elapse between manufacture and consumption. I therefore contemplate and desire to cover any proportions of ingredients not departing from the optimum enough to destroy the commercial value of the product.

While I have disclosed the use of diatomaceous earth as a filler I wish it understood that other equivalent fillers such as for example wood flour or the like may be employed. The filler is relatively more important in this composition than the perfume and abrasive, the latter being capable of being omitted without loss of anything other than their perfuming and abrasive qualities. The filler which also may be omitted serves to assist in delaying evaporation of the volatile ingredients, lowers the cost and makes a better appearing product.

This application is a continuation in part of my application Serial No. 401,382, filed October 21, 1929.

While I have described certain illustrative formulae, I wish it understood that my invention is not limited to particular ingredients and proportions except in accordance with the spirit and scope of the appended claim.

Having thus described my invention, what I claim is:

A relatively harmless, water rinsable detergent composition for removal of cellulose lacquer and stains from the skin and consisting essentially of: a highly volatile cellulose lacquer solvent capable of loosening cellulose lacquer from the skin and selected from the group consisting of butyl acetate, ethyl acetate, pentyl acetate, ethyl propionate, ethylene-glycol-mono-ethyl-ether acetate, ethylene-glycol-mono-butyl-ether acetate and mixtures thereof, in proportion of about 13% by weight, soap in proportion of about 15% by weight, a blending agent consisting of carbon tetrachloride in proportion of about 7% by weight, glycerine in proportion of about 7% by weight, filler in proportion of about 14% by weight, abradant in proportion of about 19% by weight and water in proportion of about 25% by weight.

WALDEMAR BLECH.